United States Patent [19]
Resh

[11] Patent Number: 5,877,920
[45] Date of Patent: Mar. 2, 1999

[54] HEAD SUSPENSION ASSEMBLY WITH DISPLACEMENT LIMITER

[75] Inventor: Roger A. Resh, Prior Lake, Minn.

[73] Assignee: Seagate Technology, Inc., Scotts Valley, Calif.

[21] Appl. No.: 719,527

[22] Filed: Sep. 26, 1996

Related U.S. Application Data

[60] Provisional application No. 60/021,504 Jul. 10, 1996.

[51] Int. Cl.⁶ .................................................... G11B 5/48
[52] U.S. Cl. ............................................................ 360/104
[58] Field of Search ..................................... 360/104–106

[56] References Cited

U.S. PATENT DOCUMENTS

| | | | |
|---|---|---|---|
| 4,724,500 | 2/1988 | Dalziel ..................................... | 360/103 |
| 4,922,356 | 5/1990 | Yamaguchi et al. ..................... | 360/104 |
| 5,333,085 | 7/1994 | Prentice et al. .......................... | 360/104 |
| 5,381,288 | 1/1995 | Karam, II ................................ | 360/104 |

FOREIGN PATENT DOCUMENTS

| | | | |
|---|---|---|---|
| 60-167172 | 8/1985 | Japan ...................................... | 360/104 |
| 62-145583 | 6/1987 | Japan ...................................... | 360/104 |

*Primary Examiner*—Allen T. Cao
*Attorney, Agent, or Firm*—Westman, Champlin & Kelly, P.A.

[57] ABSTRACT

A disc drive head suspension assembly includes a recording head, a load beam and a gimbal. The recording head includes a recording surface and a back surface. The load beam includes a front surface, a back surface, a distal end and a load protrusion. The load protrusion extends from the front surface of the load beam toward the back surface of the recording head. The gimbal is attached to the back surface of the load beam and includes a head mounting tab which is positioned beyond the distal end of the load beam. The recording head is attached to the head mounting tab. A first displacement limiter extends between the load beam and the gimbal, which limits vertical displacement of the gimbal in a direction toward the recording head relative to the load beam.

21 Claims, 9 Drawing Sheets

HEAD SUSPENSION ASSEMBLY WITH DISPLACEMENT LIMITER

CROSS-REFERENCE TO RELATED APPLICATION

This application claims priority from U.S. Provisional Application Ser. No. 60/021,504, filed Jul 10, 1996 and entitled "Flexure Displacement Limiter —Reverse Side Flexure Attach."

BACKGROUND OF THE INVENTION

The present invention relates to disc drive storage systems and, more particularly, to a head suspension assembly having a flexure displacement limiter.

Disc drives of the "Winchester" type are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective recording heads. A recording head includes a hydrodynamic (e.g. air) bearing slider and a transducer for writing information to and reading information from the disc surface. An actuator mechanism moves the heads from track to track across the surfaces of the discs under control of electronic circuitry. The actuator mechanism includes a track accessing arm and a head suspension assembly for each head.

The head suspension assembly includes a load beam and a gimbal. The load beam provides a preload force which forces the head toward the disc surface. The gimbal is positioned between the load beam and the slider to provide a resilient connection that allows the slider to pitch and roll while following the topography of the disc. The slider includes an air bearing surface which faces the disc surface. A conventional catamaran slider includes a pair of raised side rails which face the disc surface and form air bearing surfaces. As the disc rotates, the disc drags air under the slider along the air bearing surfaces in a direction approximately parallel to the tangential velocity of the disc. As the air passes beneath the side rails, skin friction on the air bearing surfaces causes the air pressure between the disc and the air bearing surfaces to increase which creates a hydrodynamic lifting force that causes the slider to lift and fly above the disc surface. The preload force supplied by the load beam counteracts the hydrodynamic lifting force. The preload force and the hydrodynamic lifting force reach an equilibrium based upon the hydrodynamic properties of the slider and the speed of rotation of the disc.

The preload force is transferred from the load beam to the back surface of the slider through a spherical load point button, which is typically a stamped feature on the gimbal having an apex that contacts the under surface of the load beam. The load point button provides a point about which the slider can pitch and roll and limits vertical displacement of the head and gimbal in a direction away from the disc surface. However, this structure does not limit vertical displacement in a direction toward the disc surface, which can cause damage to the delicate flexure features of the gimbal.

Undesirable vertical displacement can occur due to forces applied during assembly, fly testing or shipping and handling. For example, transportation shock may generate displacement forces large enough to yield the twisted wire electrical interconnections to the head or cause the delicate flexure features of the gimbal to bend past their yield point, which may result in separation between the load beam and the head at the load point button. Also, certain disc drives have a ramp which lifts the load beam to unload the slider from the disc surface during start and stop of disc rotation. If the slider is a self-loading slider, subambient pressure developed between the slider and the disc surface can cause a large vertical displacement of the gimbal as the slider is lifted from the disc surface. This displacement can cause damage to the gimbal flexure features.

One attempt at solving this problem is to form "hooks" on the gimbal which wrap around the distal end of the load beam to prevent the undesirable vertical motion. The primary disadvantage of this approach is that during assembly, the gimbal must be slid in a longitudinal direction along the load beam to interleave the gimbal between the load beam and the formed hooks. Once interleaved, the gimbal can be aligned for welding to the load beam. This results in a suspension assembly that is very difficult and time consuming to manufacture.

SUMMARY OF THE INVENTION

The head suspension assembly of the present invention includes a recording head, a load beam and a gimbal. The recording head includes a recording surface and a back surface. The load beam includes a front surface, a back surface, a distal end and a load protrusion. The load protrusion extends from the front surface of the load beam toward the back surface of the recording head. The gimbal is attached to the back surface of the load beam and includes a head mounting pad which is positioned beyond the distal end of the load beam. The recording head is attached to the head mounting pad. A first displacement limiter extends between the load beam and the gimbal, which limits vertical displacement of the gimbal in a direction toward the recording head relative to the load beam.

In one embodiment, the gimbal has a mounting portion and a flexure portion. The flexure portion has a cutout which forms first and second spaced flexure beams extending parallel to the longitudinal axis of the load beam and a cross member extending between the flexure beams beyond the distal end of the load beam. The cross member forms the head mounting pad. The gimbal further includes a front surface and a back surface, with the front surface facing the back surface of the load beam. The first displacement limiter extends from the periphery of the load beam toward the first flexure beam in a direction transverse to the longitudinal axis and overlaps the first flexure beam. The first displacement limiter has a vertical bend which offsets the first displacement limiter toward the recording head from a plane defined by the back surface of the load beam to provide a predetermined vertical clearance between the first displacement limiter and the first flexure beam.

Similarly, a second displacement limiter extends from the periphery of the load beam toward the second flexure beam in a direction transverse to the longitudinal axis and overlaps the second flexure beam. The first and second displacement limiters limit vertical displacement of the gimbal in a direction toward the recording head relative to the load beam. The vertical displacement is limited to the clearance between the displacement limiters and the flexure beams.

In another embodiment, the first and second displacement limiters extend from the inner periphery of the gimbal toward the load beam and overlap the load beam. The first and second displacement limiters can extend from the first and second flexure beams, respectively, or from the cross member.

DETAILED DESCRIPTION OF THE PREFERRED EMBODIMENTS

Figure 1:
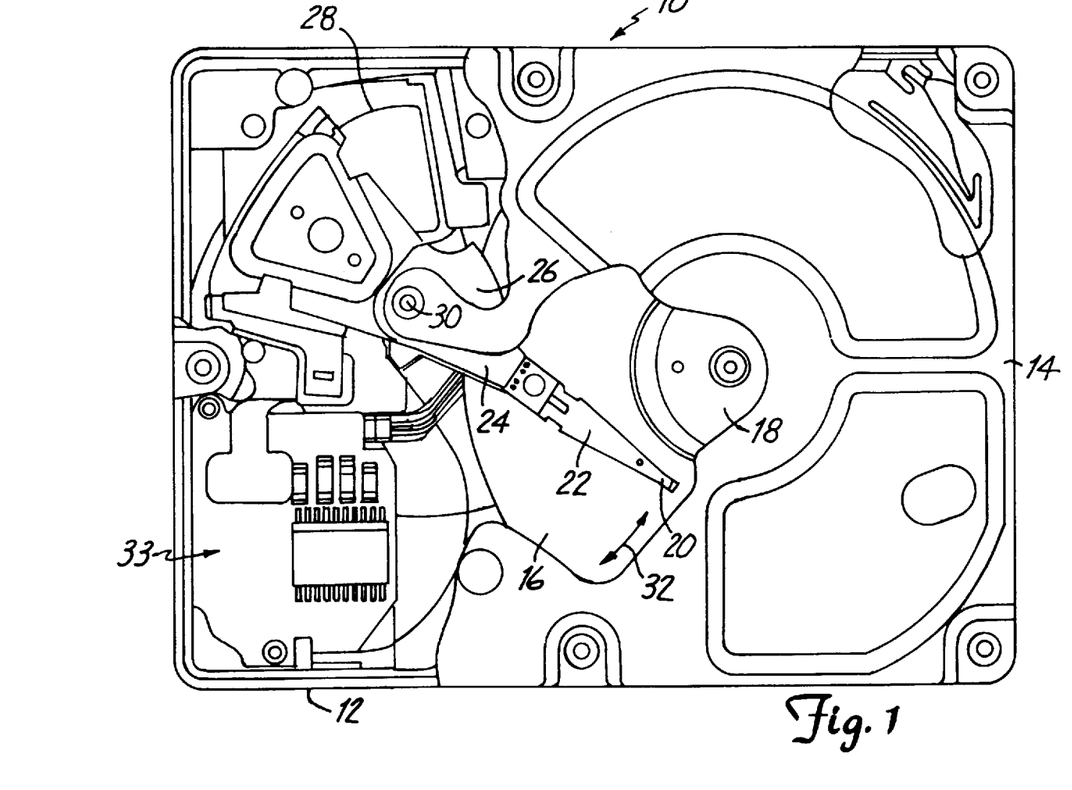
FIG. 1 is a top plan view of a disc drive data storage device in which the present invention is useful.

FIG. 1 is a plan view of a typical disc drive 10. Disc drive 10 includes a housing with a base 12 and a top cover 14 (portions of top cover 14 are removed for clarity). Disc drive 10 further includes a disc pack 16, which is mounted on a spindle motor (not shown) by a disc clamp 18. Disc pack 16 includes a plurality of individual discs which are mounted for co-rotation about a central axis. Each disc surface has an associated head 20 which is mounted to disc drive 10 for communication with the disc surface. Heads 20 are supported by head suspension assemblies 22 which are in turn attached to track accessing arms 24 of an actuator 26. Voice coil motor 28 rotates actuator 26 with its attached heads 20 about a pivot shaft 30 to position heads 20 over a desired data track along an arcuate path 32 under the control of electronic circuitry 33.

Figure 2:
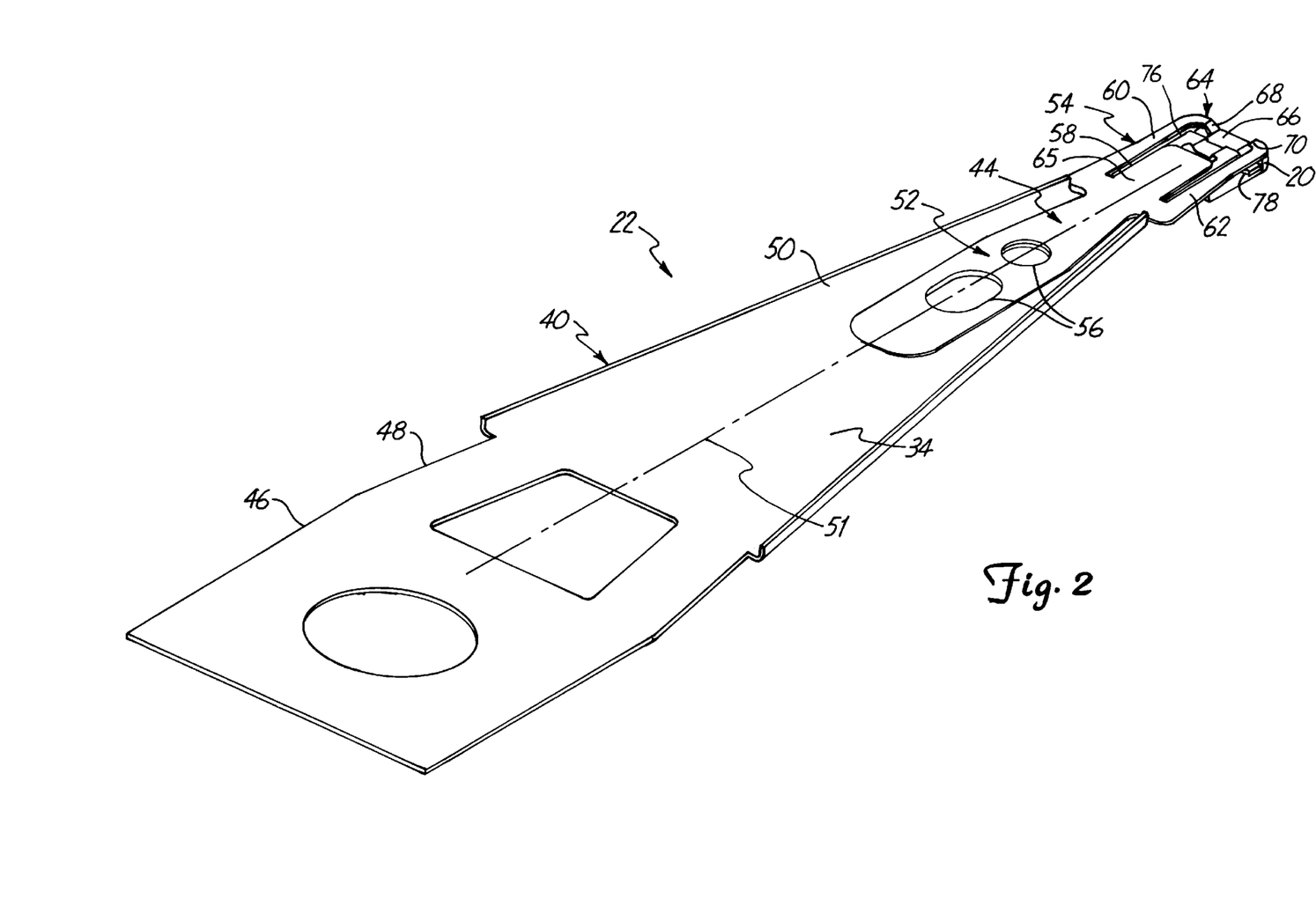
FIG. 2 is a perspective view of a head suspension assembly according to the present invention, as viewed from a back surface.

FIG. 2 is a perspective view of a head suspension assembly 22, as viewed from a back surface 34. Head suspension assembly 22 includes load beam 40 and gimbal 44. Load beam 40 includes mounting portion 46, flexible beam portion 48, rigid beam portion 50 and longitudinal axis 51. Mounting portion 46 is mounted to track accessing arm 24 (shown in FIG. 1). Flexible beam portion 48 supplies a preload force to determine the flying height of head 20. Rigid beam portion 50 transfers the preload force from flexible beam portion 48 to head 20.

Gimbal 44 is attached to back surface 34 of load beam 40. Gimbal 44 includes rearward mounting portion 52 and forward flexure portion 54. Mounting portion 52 has alignment features 56 which mate with corresponding alignment features in load beam 40 when gimbal 44 is attached to load beam 40. Gimbal 44 can be attached to load beam 40 in a variety of ways, such as by welding or with an adhesive.

Flexure portion 54 includes a cutout 58 which forms flexure beams 60 and 62, cross member 64 and tongue 65. Flexure beams 60 and 62 are generally parallel to longitudinal axis 51 of load beam 40. Tongue 65 is welded to load beam 40 to provide additional stiffness to the load beam's distal end. In a preferred embodiment, the features of gimbal 44 are photo-etched from stainless steel stock. Through-etching is accomplished using matching masking patterns on both sides of the material. When the material thus masked is exposed to the etchant, the exposed material is etched from both surfaces until it is completely etched away.

Cross member 64 includes head mounting pad 66 and bends 68 and 70. Bends 68 and 70 offset head mounting pad 66 vertically from a plane defined by flexure beams 60 and 62. Head mounting pad 66 is attached to the back surface of head 20 with an adhesive, for example. Cross member 64 and head mounting pad 66 are positioned beyond distal end 72 of load beam 40.

Displacement limiters 76 and 78 extend from a perimeter of load beam 40, at distal end 72, in a direction transverse to longitudinal axis 51, toward flexure beams 60 and 62, respectively. Displacement limiters 76 and 78 overlap flexure beams 60 and 62. Displacement limiter 76 and 78 limit vertical displacement of head 20 and flexure portion 54 of gimbal 44 in a downward direction toward disc 16 (shown in FIG. 1) with respect to load beam 40.

In the embodiment shown in FIG. 2, load beam 40 and displacement limiters 76 and 78 are formed of a single continuous piece of material. In an alternative embodiment, load beam 40 is formed of a separate piece of material which is attached to displacement limiters 76 and 78.

Figure 3:
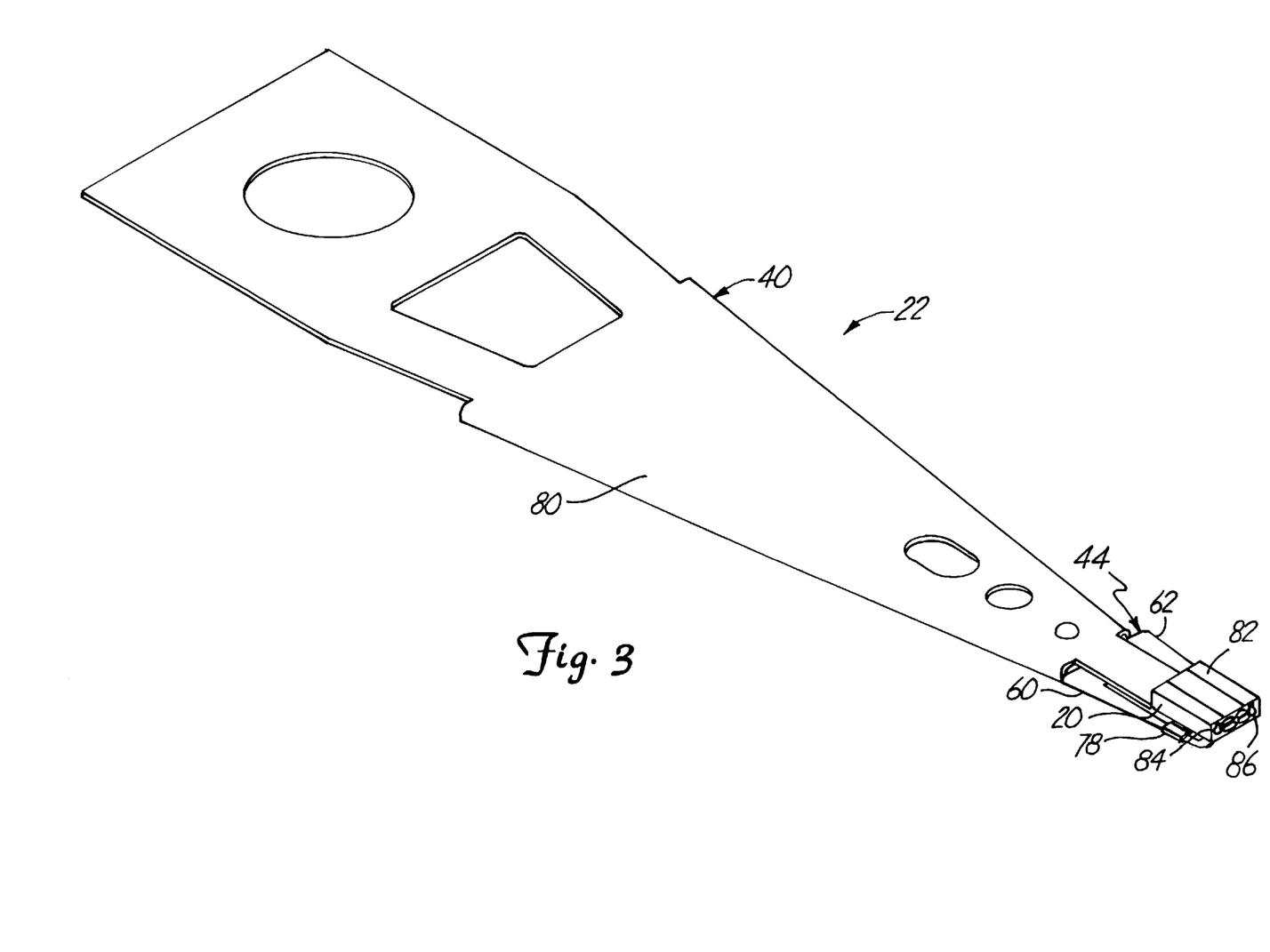
FIG. 3 is perspective view of the head suspension assembly, as viewed from a front surface.

FIG. 3 is perspective view of head suspension assembly 22, as viewed from a front surface 80 of load beam 40. Head 20 has recording surface 82 with one or more air bearing features. Transducers 84 and 86 are carried along a trailing edge of head 20 for communicating with individual bit positions on the disc surface. Transducers 84 and 86 include associated electrical bond pads for connection to electrical conductors (not shown) which transmit read and write signals to and from the transducers. Typically, only one of the transducers 84 and 86 is active. The active transducer is traditionally the transducer positioned along the trailing edge of the outer air bearing rail with respect to the radius of disc 16 (shown in FIG. 1). In an alternative embodiment, a single transducer is mounted to the trailing edge of a center rail or pad which is positioned between the side rails. Other transducer mounting positions can also be used.

Figure 4:
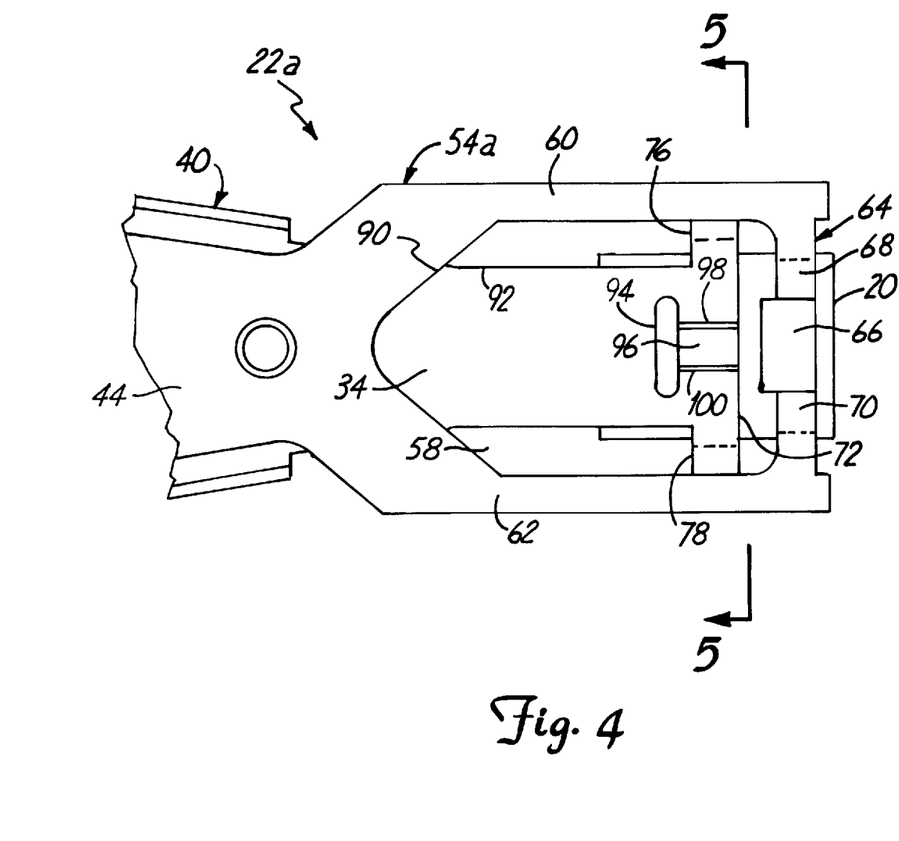
FIG. 4 is a top plan view of a distal end of a head suspension assembly having an alternative flexure structure.

FIG. 4 is a top plan view of a head suspension assembly 22a according to an alternative embodiment of the present invention. The same reference numerals are used in FIG. 4 as were used in FIGS. 1–2 for the same or similar elements. Flexure portion 54a has a different configuration than that shown in FIG. 2. Specifically, tongue 65 has been removed. Otherwise, the embodiments are the same.

FIG. 4 illustrates a distal end of the head suspension assembly in greater detail. Flexure portion 54a has an inner periphery 90 along flexure beams 60 and 62 and cross member 64 which is external to an outer periphery 92 of load beam 40, except at displacement limiters 76 and 78. This allows flexure beams 60 and 62 to remain compliant in the pitch and roll axes of head 20. Bends 68 and 70 in cross member 64 offset head mounting pad 66 toward the back surface of recording head 20 with respect to flexure beams 60 and 62 such that head mounting pad 66 has a vertical position which is between back surface 34 of load beam 40 and the back surface of head 20. Similarly, load beam 40 includes aperture 94 and load transfer pad 96. Bends 98 and 100 offset pad 96 vertically toward head 20. Aperture 94 provides strain relief for bends 98 and 100.

Figure 5:
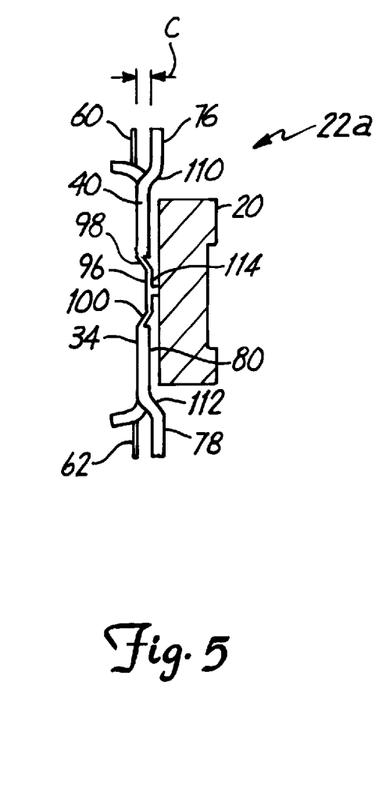
FIG. 5 is a sectional view of the head suspension assembly as viewed along lines 5—5 of FIG. 4.

FIG. 5 is a sectional view of head suspension assembly 22a, as viewed along lines 5—5 of FIG. 4, which illustrates the offset of the deflection limiters in greater detail. Deflection limiters 76 and 78 include vertical bends 110 and 112 which offset the displacement limiters toward head 20 from a plane defined by back surface 34 of load beam 40. The offset provides a predetermined clearance C between the displacement limiters and the flexure beams. Clearance C is preferably as small as possible but large enough such that displacement limiters 76 and 78 do not interfere with the normal pitching and rolling action of beams 60 and 62. In one embodiment, clearance C is 3 mils, but can have a range of 2 to 4 mils, for example.

The offset of load transfer tab 96 is also shown in greater detail in FIG. 5. Bends 98 and 100 offset load transfer tab 96 toward head 20. Load transfer tab 96 is partially etched from front surface 80 to a reduced thickness, except at load button 114. Load point button 114 remains as a raised, isolated feature which provides a point about which head 20 can pitch and roll while following the topography of the disc. Load beam 40 transfers the preload force to head 20 through load point button 114.

In a partial etching process, the masking patterns on opposite sides of the material to be partially etched do not match. One side of the material in the area to be partially etched is covered by the mask, while the other side of the material is exposed to the etchant. By this method, material is removed from only one side of the material. Control of the etchant strength and the exposure time allow the thickness of the material in these partially-etched areas to be selectively reduced to a desired thickness. In practice, it has been found that is fairly easy to reduce material thickness by approximately 60% in areas having unmatched masks, while simultaneously through-etching those areas where the mask is identical on both sides of the material. In an alternative embodiment, the load point button is formed by a stamping process to create a spherically-shaped dimple in the direction of head 20, as opposed to partial etching.

The head suspension assembly of the present invention has features that limit flexure displacement toward the disc surface and yet remains very simple to manufacture. There are no complex or time consuming interleaving steps required, as in the prior art. First, the gimbal is aligned with and welded to the load beam. Next, the gimbal and the load beam are together placed over the head and adhered to the head along the head mounting pad. The head suspension assembly can therefore be easily manufactured in a batch process where more than one head suspension is assembled at one time.

Figure 6A:
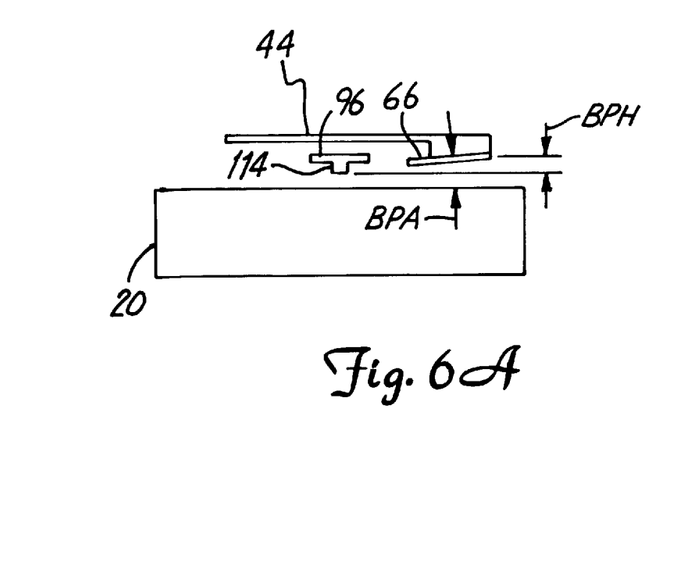
FIG. 6a is a schematic, side plan view of the head suspension assembly illustrating a bond pad angle.
Figure 6B:
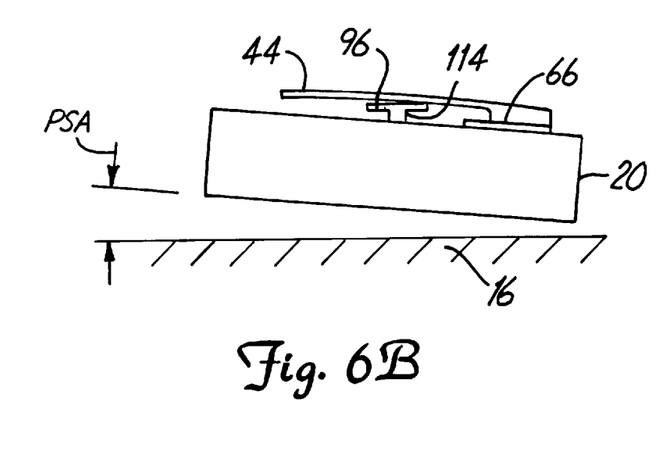
FIG. 6b is a schematic, side plan view of the head suspension assembly illustrating a pitch static angle.

FIGS. 6a and 6b are schematic, side views of head 20 and gimbal 44 which illustrate a bond pad angle ("BPA") and a pitch static angle ("PSA"). Head mounting pad 66 is formed at an angle, labeled BPA, with respect to the back surface of head 20 when the head is parallel to the remaining portion of gimbal 44. On one embodiment, BPA=−0.5 degrees. The center of head mounting pad 66 is offset in a vertical direction from an apex of load point button 114 by a distance defined as the bond pad height ("BPH"). In one embodiment, BPH=1.8 mils.

FIG. 6b illustrates the PSA of head 20 when head 20 is attached to head mounting pad 66. PSA refers to the angle that the air bearing surface of head 20 makes relative to a plane parallel to mounting portion 46 (shown in FIG. 2) of load beam 40 when load beam 40 is lifted to a specified height above disc 16 and head 20 is allowed to rotate freely. The PSA is a function of the BPH and the BPA. The BPH and BPA are selected to achieve a desired PSA.

Figure 7:
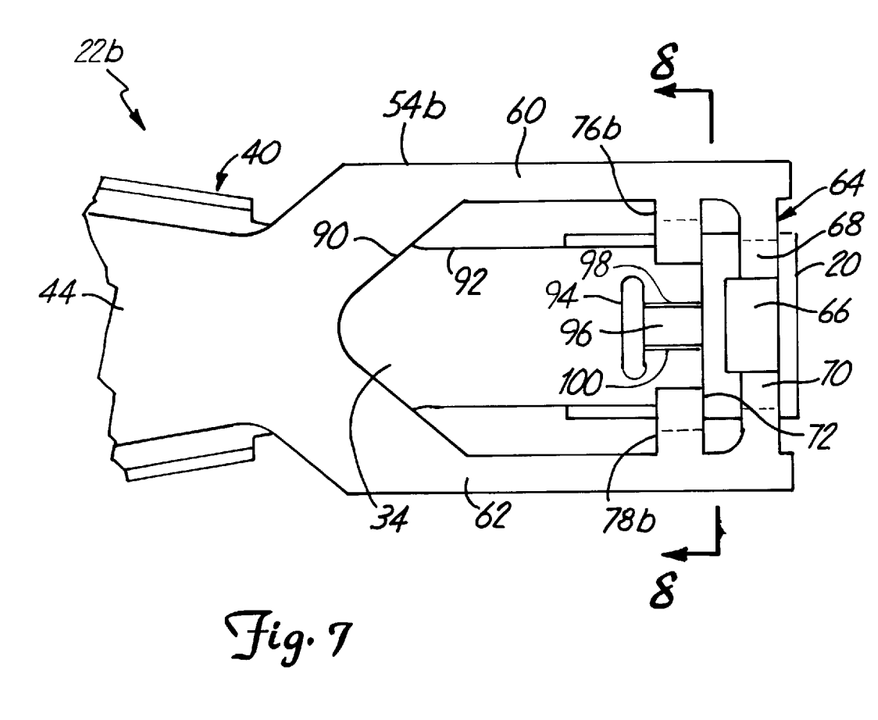
FIG. 7 is a top plan view of a distal end of a head suspension assembly according to an alternative embodiment of the present invention.
Figure 8:
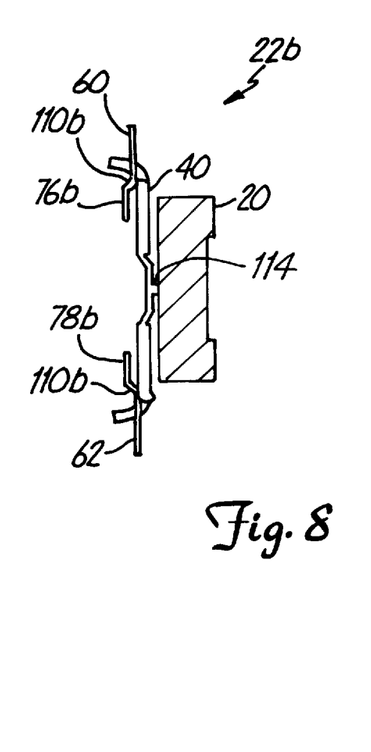
FIG. 8 is a sectional view of the head suspension assembly as viewed along lines 8—8 of FIG. 7.

FIG. 7 is a top plan view of the distal end of a head suspension assembly 22b according to an alternative embodiment of the present invention. FIG. 8 is a sectional view as seen along lines 8—8 of FIG. 7. The same reference numerals are used in FIGS. 7 and 8 as were used in FIGS. 4 and 5 for the same or similar elements. In this embodiment, displacement limiters 76b and 78b extend from flexure beams 60 and 62, as opposed to load beam 40. Displacement limiters 76b and 78b extend toward and overlap load beam 40. Displacement limiters 76b and 78b and gimbal 44 are formed of a single, continuous piece of material. In an alternative embodiment, displacement limiters 76b and 78b are formed of separate pieces of material which are attached to flexure beams 60 and 62.

As shown in FIG. 8, displacement limiters 76b and 78b have bends 110b and 112b, respectively, which offset the displacement limiters in a vertical direction away from head 20 with respect to back surface 34 of load beam 40. This provides a predetermined clearance between the displacement limiters and the load beam.

Figure 9:
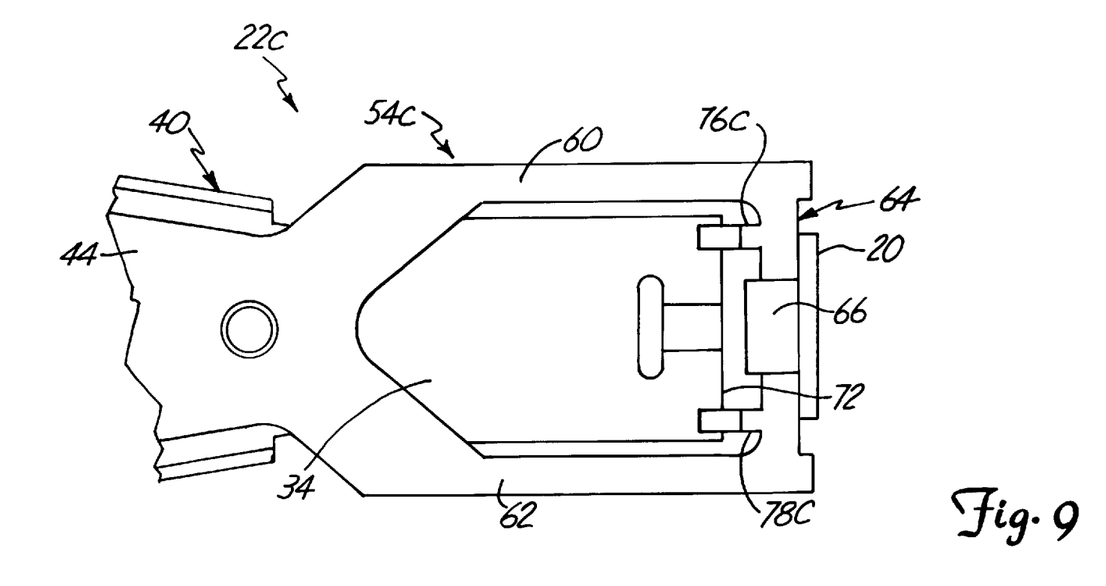
FIG. 9 is a top plan view of a head suspension assembly having displacement limiters extending from a cross member on the gimbal.

FIG. 9 is a plan view of the distal end of a head suspension assembly 22c according to another alternative embodiment of the present invention. In FIG. 9, displacement limiters 76c and 78c extend from cross member 64 toward the distal end 72 of load beam 40 and overlap load beam 40. Like displacement limiters 76b and 78b, limiters 76c and 78c have vertical bends which offset the displacement limiters in a direction away from head 20 with respect to back surface 34 of load beam 40 to provide a predetermined clearance between the displacement limiters and the load beam.

Figure 10:
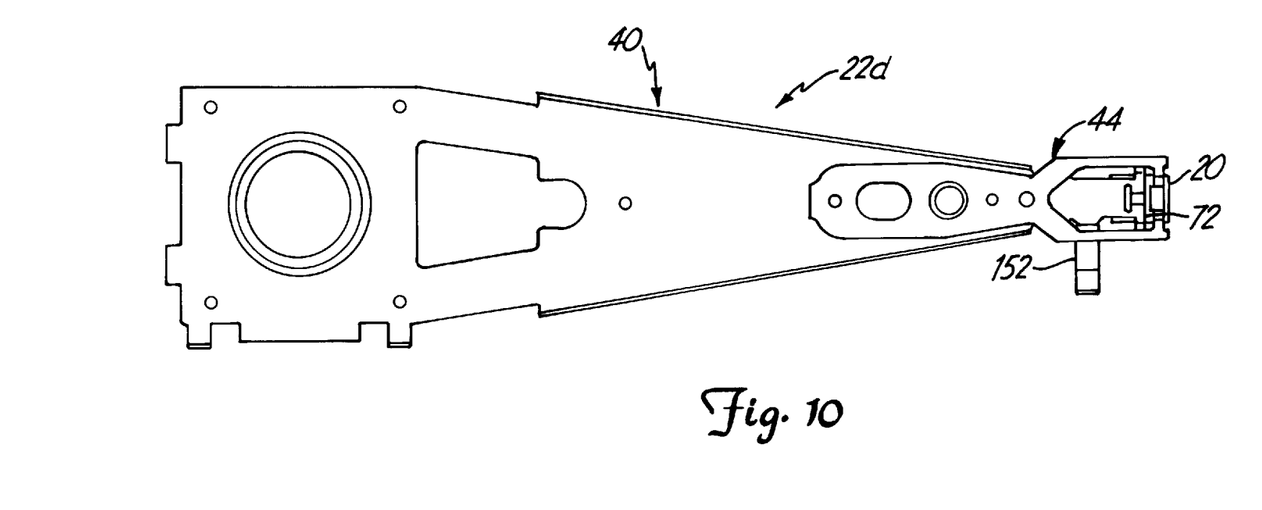
FIG. 10 is a top plan view of a head suspension assembly having a lift tab, according to the present invention.

FIG. 10 is a plan view of a head suspension assembly according to another alternative embodiment of the present invention. Once again, the same reference numerals are used in FIG. 10 as were used in the previous figures for the same or similar elements. Head suspension assembly 22d includes load beam 40, gimbal 44 and head 20. Load beam 40 further includes lift tab 152 extending from a side edge of load beam 40 near distal end 72. Lift tab 152 is used to lift head 20 from the disc surface during the start and stop of disc rotation. For example, as the disc stops rotation, the track accessing arm moves load beam 40 and attached head 20 to a landing zone where lift tab 152 engages a ramp (not shown) attached to the drive housing which lifts tab 152 and thus head 120 vertically with respect to the disc surface.

Figure 11:
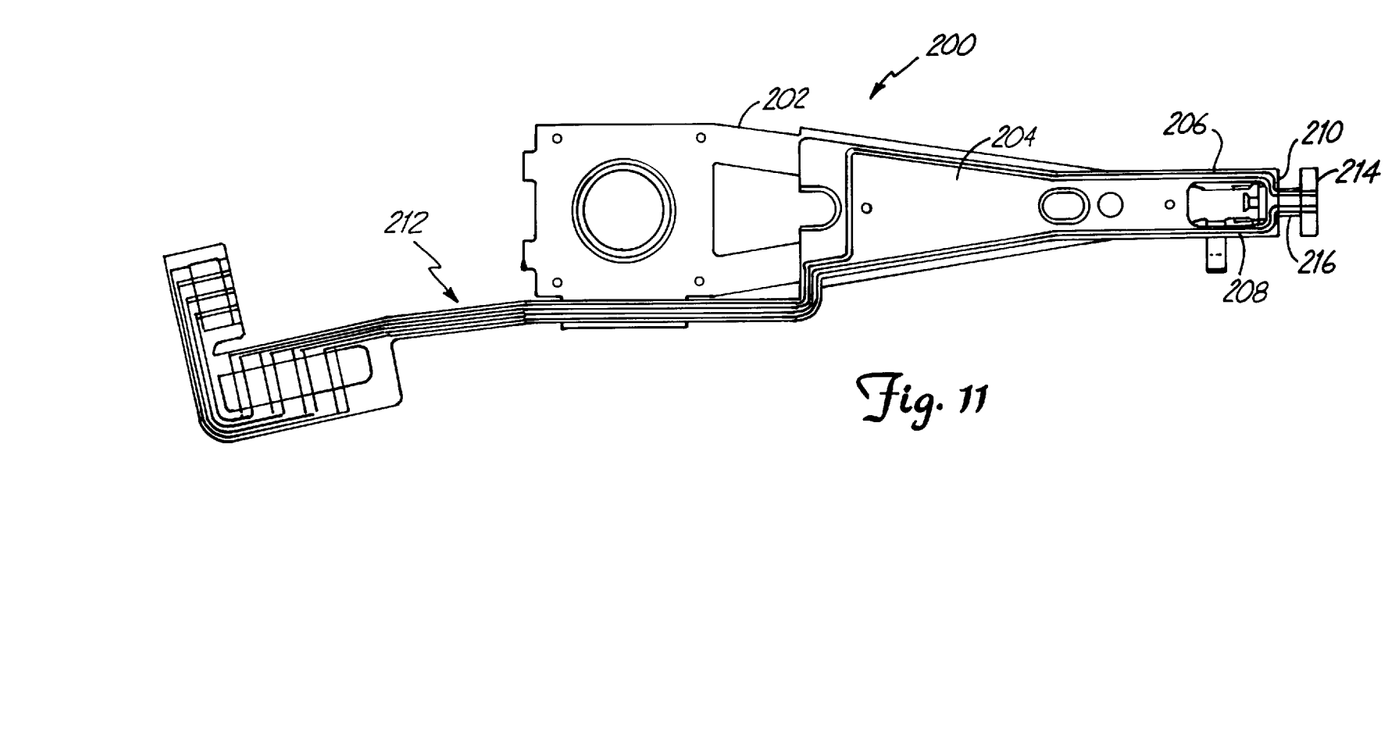
FIG. 11 is a top plan view of a head suspension assembly having a gimbal with an integrated flex circuit, according to the present invention.

FIG. 11 is a plan view of a head suspension assembly according to another alternative embodiment of the present invention. Head suspension assembly 200 includes load beam 202 and gimbal 204. As in the previous embodiments, gimbal 204 includes an aperture at its distal end which forms a pair flexure beams 206 and 208 and a cross member 210. However, electrical conductors 212 are integrated onto the back surface of gimbal 204 by applying a dielectric layer and then a conductor layer on the back surface. The conductor layer and the dielectric layer are then etched in a desired pattern to form electrical traces. The electrical traces extend from the distal end of gimbal 204 for attachment to the trailing edge of the head (not shown). During attachment, tab 214 is folded over such that traces 216 contact associated bonding pads along the trailing edge of the head. Traces 216 are then bonded to the bonding pads and tab 214 is broken away.

CONCLUSION

The head suspension assembly of the present invention is easy to assemble and limits deflection of the delicate gimbal flexure features in a direction toward the disc surface. This results in reduced handling damage, improved robustness to non-operating shock during shipping and prevents gimbal damage during ramp unloading with subambient pressure slider designs. The displacement limiters significantly increase the force required to bend the flexure beams past their yield point. Also, displacement of the flexure at the higher force levels is greatly reduced. This reduces risk of wire yield and potentially reduces separation between the head and the load point button.

The present invention does not require the gimbal tongue to be positioned underneath the load point button. This allows the flexure to be placed on the load beam surface opposite to the disc which eliminates the need for formed "hooks" to limit displacement as in the prior art. The present invention provides clear access to the trailing surface of the head for routing and bonding electrical conductors. The present invention also is compatible with conductor routes to the back surface of the head.

Although the present invention has been described with reference to preferred embodiments, workers skilled in the art will recognize that changes may be made in form and detail without departing from the spirit and scope of the invention.

What is claimed is:

1. A disc drive head suspension assembly comprising:
   a recording head comprising a recording surface and a back surface;
   a load beam comprising a front surface, a back surface and a distal end, wherein the front surface of the load beam faces the back surface of the recording head;
   a gimbal attached to the back surface of the load beam and having a head mounting tab positioned beyond the distal end of the load beam, wherein the recording head is attached to the head mounting tab; and
   a first displacement limiter extending between the load beam and the gimbal which limits vertical displacement of the gimbal in a direction toward the recording head relative to the load beam.

2. The disc drive head suspension assembly of claim 1 wherein:
   the load beam has a longitudinal axis; and
   the gimbal has a mounting portion and a flexure portion, the flexure portion having a cutout which forms first and second spaced flexure beams extending parallel to the longitudinal axis and a cross member extending between the flexure beams beyond the distal end of the load beam, wherein the cross member forms the head mounting tab.

3. The disc drive head suspension assembly of claim 2 wherein the load beam further comprises a load protrusion which extends from the front surface of the load beam toward the back surface of the recording head and has an apex, and wherein the cross member has a vertical bend which offsets the head mounting tab toward the recording head with respect to the first and second flexure beams such that the head mounting tab has a vertical position which is between the back surface of the load beam and the recording head.

4. The disc drive head suspension assembly of claim 2 wherein:
   the gimbal has a front surface and a back surface, the front surface facing the back surface of the load beam; and
   the first displacement limiter extends from the periphery of the load beam toward the first flexure beam in a direction transverse to the longitudinal axis and overlaps the first flexure beam.

5. The disc drive head suspension assembly of claim 4 wherein:
   the first displacement limiter has vertical bend, which offsets the first displacement limiter toward the recording head from a plane defined by the back surface of the load beam to provide a predetermined vertical clearance between the first displacement limiter and the first flexure beam.

6. The disc drive head suspension assembly of claim 4 wherein the first displacement limiter is positioned at the distal end of the load beam.

7. The disc drive head suspension assembly of claim 4 and further comprising a second displacement limiter extending from the periphery of load beam toward the second flexure beam in a direction transverse to the longitudinal axis and overlapping the second flexure beam.

8. The disc drive head suspension assembly of claim 4 wherein the first and second flexure beams are positioned beyond the periphery of the load beam except at the first displacement limiter.

9. The disc drive head suspension assembly of claim 1 wherein the first displacement limiter and the load beam are formed of a single continuous piece of material.

10. The disc drive head suspension assembly of claim 1 wherein the first displacement limiter and the load beam are formed of separate pieces of material, with the first displacement limiter attached to the load beam.

11. The disc drive head suspension assembly of claim 2 wherein:
    the gimbal has a front surface, a back surface and an inner periphery along the cutout, wherein the front surface of the gimbal faces the back surface of the load beam; and
    the first displacement limiter extends from the inner periphery of the gimbal toward the load beam and overlaps the load beam.

12. The disc drive head suspension assembly of claim 11 wherein the first displacement limiter extends from the first flexure beam toward the load beam in a direction transverse to the longitudinal axis.

13. The disc drive head suspension assembly of claim 12 and further comprising a second displacement limiter extending from the second flexure beam toward the load beam and overlapping the load beam.

14. The disc drive head suspension assembly of claim 11 wherein the first displacement limiter extends from the cross member toward the load beam in a direction parallel to the longitudinal axis.

15. The disc drive head suspension assembly of claim 11 wherein:
    the first displacement limiter has vertical bend which offsets the first displacement limiter in a direction away from the recording head with respect to the back surface of the gimbal to provide a predetermined vertical clearance between the first displacement limiter and the load beam.

16. The disc drive head suspension assembly of claim 11 wherein the first displacement limiter overlaps the load beam at the distal end of the load beam.

17. The disc drive head suspension assembly of claim 11 wherein the first and second flexure beams are positioned beyond the periphery of the load beam except at the first displacement limiter.

18. The disc drive head suspension assembly of claim 1 wherein the first displacement limiter and the gimbal are formed of a single continuous piece of material.

19. The disc drive head suspension assembly of claim 1 wherein the first displacement limiter and the gimbal are formed of separate pieces of material, with the first displacement limiter attached to the gimbal.

20. A disc drive comprising:

a housing;

a disc mounted in the housing for rotation about a central axis;

a recording head positioned proximate to the disc and comprising a recording surface and a back surface;

a track accessing arm supported over the disc;

a load beam carried by the track accessing arm and comprising a front surface, a back surface and a distal end, wherein the front surface of the load beam faces the back surface of the recording head;

a gimbal attached to the back surface of the load beam and having a head mounting tab positioned beyond the distal end of the load beam, wherein the head mounting tap is attached to the recording head; and a first displacement limiter extending between the load beam and the gimbal which limits vertical displacement of the gimbal in a direction toward the disc relative to the load beam.

21. A disc drive head suspension assembly for carrying a recording head proximate to a data storage disc, the assembly comprising:

a load beam comprising a front surface, a back surface, a distal end and a load protrusion, wherein the load protrusion extends from the front surface of the load beam;

a gimbal attached to the back surface of the load beam and having head mounting means for attaching to the recording head such that the recording head is positioned opposite to the load beam with respect to the gimbal; and displacement limiter means extending between the load beam and the gimbal for limiting vertical displacement of the gimbal in a direction toward the recording head relative to the load beam.

* * * * *